Figure 1:
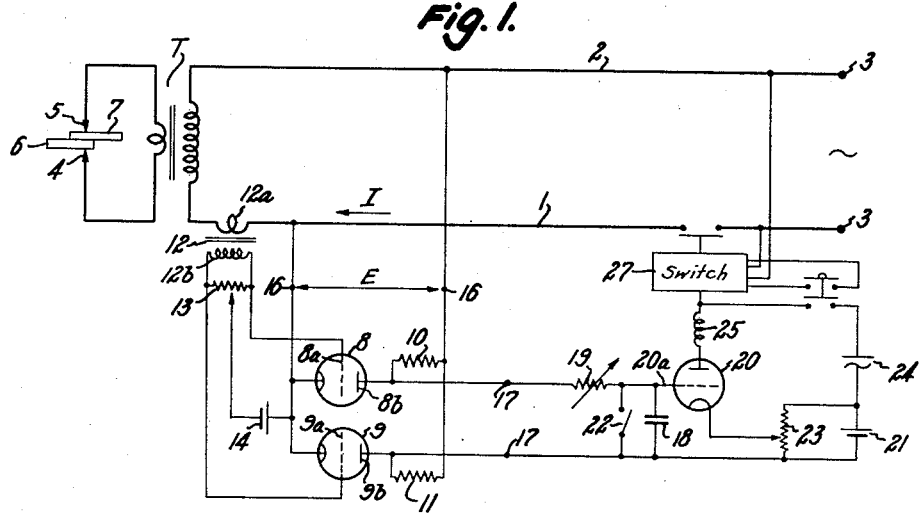

Nov. 16, 1954          K. RUETSCHI          2,694,762

APPARATUS FOR RESISTANCE WELDING

Filed July 12, 1950          2 Sheets-Sheet 1

Inventor
Karl Ruetschi
By Pierce Scheffler & Parker
Attorneys

United States Patent Office 2,694,762
Patented Nov. 16, 1954

2,694,762

APPARATUS FOR RESISTANCE WELDING

Karl Ruetschi, Regenstorf, Switzerland, assignor to Aktiengesellschaft Brown, Boveri, & Cie., Baden, Switzerland, a joint-stock company Application July 12, 1950, Serial No. 173,383

Claims priority, application Switzerland July 16, 1949

1 Claim. (Cl. 219—4)

The present invention relates to apparatus for resistance welding and more particularly to an improved arrangement for controlling the amount of energy flowing to the junction between two metallic parts that are to be joined together by the heating effect of an electrical current passed through the junction.

Prior to this invention, control over the amount of energy flowing through the junction has been obtained merely as a function of time. That is, for any given welding job to be done, the welding machine was timed to operate for a fixed period calculated sufficient to produce a satisfactory weld. A timer control of the fixed period type however is not entirely satisfactory because the resistance of the welding junction varies in accordance with the surface conditions of the parts to be united. If such surfaces at the junction are scaly, rusty, oxidized, or highly polished it is obvious that the total amount of energy flowing into the junction for any given and arbitrary preselected time will not be uniform. Thus some welds will be imperfect for a lack of adequate heating while others may receive too much heating resulting in a burning away of the material at the welding spot. The irregularities from spot to spot increase as the selected welding time is shortened and likewise increase with a decrease in short-circuit impedance of the welding machine.

The object of the present invention is to provide an improved welding control system wherein the control is made a function not of time but rather a function of the amount of energy which is stored in the welding junction, the timer being so arranged that the welding current is cut off as soon as a preselected energy total is reached.

A more specific object is to provide a welding timer comprising an integrating device for totalizing the amount of energy flowing to the weld junction, means for comparing this energy as it is being totalized with a selected standard energy total considered adequate to produce a satisfactory weld, and means for switching off the welding current as soon as the energy being totalized reaches the level of the selected standard.

Yet another object is to provide a welding timer comprising a metering device having an output potential variable with the instantaneous power flowing to the weld junction, a condenser charged by such potential through a potentiometer, the potential thus being integrated in the condenser as a function of time, means comparing the potential to which the condenser is charged with a standard potential, and means for interrupting the welding current as soon as the condenser potential reaches the level of the standard potential.

Figure 2:
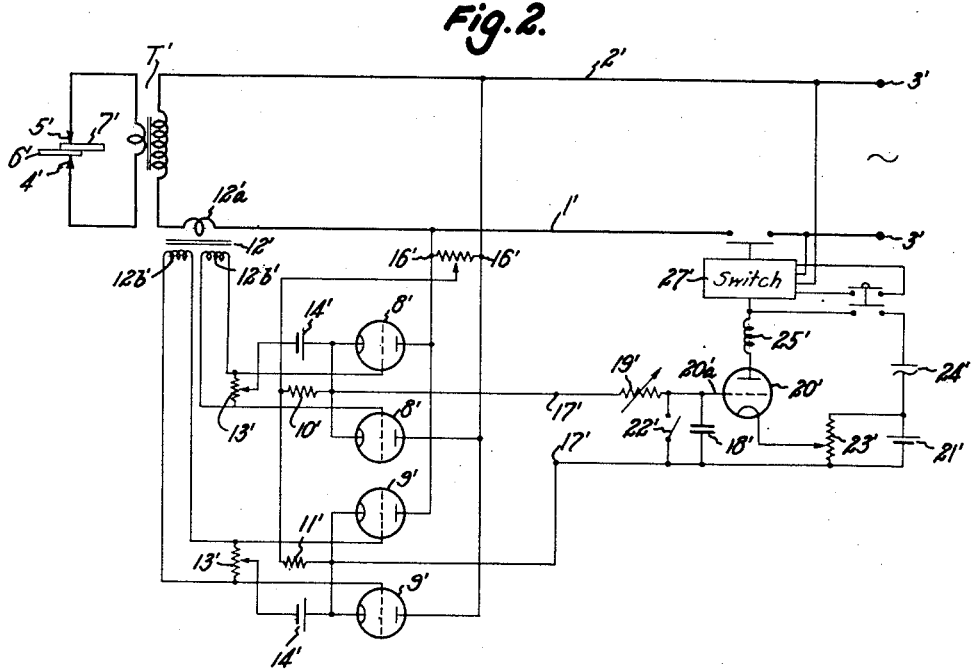
Figure 3:
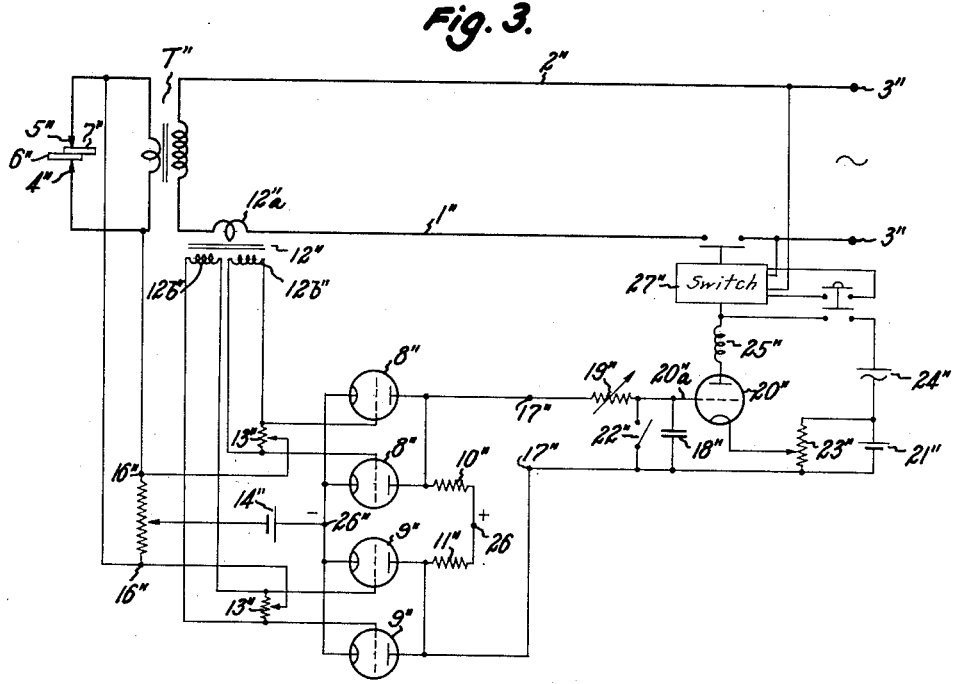

The foregoing as well as other objects and advantages inherent in the improved welding timer control will become more apparent from the following detailed description of a few typical embodiments thereof when considered with the accompanying drawings in which:

Fig. 1 is a schematic diagram showing an embodiment of the invention as applied to a resistance welder of the alternating current type and in which the energy is totalized only over the positive half of the wave of the alternating welding voltage, and Figs. 2 and 3 are modifications of the Fig. 1 control wherein the welding energy is totalized over both halves of the wave of alternating welding voltage.

Referring now to Fig. 1, the welding circuit proper has been illustrated in its most simplified form since it is the control for the latter to which the present invention relates. Thus the circuit shown in heavy lines consists of conductors 1, 2 extending over a welding transformer T from an alternating current source, represented by terminals 3, to electrodes 4, 5 applied to overlapped plates 6, 7 which are to be welded by passing current through the plates from one electrode to the other.

The welding junction heated with an electrical energy $n$ variable with time ($t$) as desired heats up according to the well known differential equation:

$$A \cdot n(t) = B \Delta T' + \Delta T$$

where $A$ and $B$ are constants, $t$ is time, and $\Delta T$ is the increase in temperature.

The same differential equation also governs the potential $U_c$ at a condenser $C$ if the latter is charged across a resistance $R$ with a potential $U_{(t)}$ variable in time as desired.

That is:

$$U_{(t)} = RC \cdot U'_c + U_c$$

If $U_{(t)}$ is then made proportional to $n_{(t)}$, and $B$ equals $R \cdot C$, the potential $U_c$ at the condenser will increase exactly proportionally to the temperature $T$ and hence also to the stored energy $c \cdot m \cdot T$, where $c$ is the specific heat and $m$ the mass. In other words, the increase in temperature can be represented as an increase in potential. This representation then enables continuous supervision of energy stored in the welding junction, in that the representation is compared continuously with a constant direct potential that serves as a reference and which corresponds to a particular energy total desired to be put into the welding junction. When the potential variable with the actual energy reaches the level of the reference potential, the invention then provides means for interrupting the welding current thus stopping the inflow of electrical energy to the welding junction.

In order to provide a potential variable with the amount of energy fed into the welding junction, I provide an energy "meter" popularly known as an electronic wattmeter which in Fig. 1 is comprised of the electrical circuit including a pair of triode tubes 8, 9, anode resistances 10, 11, a current transformer 12, and direct current grid negative bias potential represented by a battery 14. The primary winding 12a of current transformer 12 is connected in series with the welding circuit conductors 1, 2. The secondary winding 12b is connected over a shunt 13 with the grids 8a, 9a of tubes 8 and 9, respectively, in series with the battery 14. The anode potentials for the tubes 8, 9 is the potential of the welding circuit and is taken from terminal taps 16. Tubes 8 and 9 operate as square amplifiers and hence the potential at terminals 17 will be proportional to the momentary welding power input to the welding junction, that is, to the welding voltage $E$ at terminals 16 multiplied by the current $I$ in the welding circuit conductors 1, 2. Tubes 8 and 9 have an anode current proportional to $(u+Ki)^2$, and $(u-Ki)^2$ respectively. The difference of the two anode currents is therefore proportional to $4 \cdot K \cdot u \cdot i$ and thus to the instantaneous power.

The potential at terminals 17 is then totalized with respect to time in an integrating circuit comprising series connected condenser 18 and potentiometer resistance 19. With a correct selection of capacity, the potential on condenser 18 will at all times be proportional to the difference between the stored energy in the welding junction and the outflowing heat. Condenser 18 is connected in circuit with the grid 20a of a gas-filled tube 20 of the thyratron type. The grid 20a also includes a negative biasing potential represented by battery 21, and variable resistance 23. Power is supplied to the anode-cathode circuit of tube 20 from source 24. Contact 22 is for discharging the condenser after each weld.

The grid potentials produced by condenser 18 and battery 21 are so arranged in the grid circuit that as soon as the voltage on condenser 18 equals that of resistance 23, tube 29 will fire, thus sending a surge of current through its anode-cathode circuit and hence through relay 25 which actuates the switching device 27 and thus opens the main welding circuit and stops the flow of welding current in the conductors 1, 2.

The variable condenser potential at which tube 20 will fire depends upon the fixed or reference potential in the grid circuit of the tube, and the latter is adjusted according to the material and thickness of the plates to be welded. When welding light material where the required energy is greater, the reference potential can be increased by resistance 23.

By adjustment of the potentiometer 19, the time constant of the control system can be adapted to the thickness and material of the plates or sheets to be welded.

Moreover in lieu of the thyratron 20, it is obvious that some other type of means such as for example a differential relay could be used for comparing the integrated potential, and effecting an opening of the main welding circuit when the two potentials become equal.

The potential at terminals 17 is a measure of energy flowing only in the positive half waves of the alternating voltage E flowing in the main welding circuit. For greater demands, the control arrangement may be modified as shown more schematically in Figs. 2 or 3 by which the energy due to current I is also measured in the negative halves of the voltage wave. In both Figs. 2 and 3, the integrating portion of the control circuit from terminals 17 on through potentiometer resistor 19, condenser 18 etc. is identical with the Fig. 1 control. The Fig. 2 control is similar in operation to the Fig. 1 control and hence need not be elaborated upon. For convenience in comparison of the two, those components in Fig. 2 having the same function as corresponding components in Fig. 1 have been given the same reference characters but with primes added thereto for distinction. The control systems of Figs. 1 and 2 are especially suitable for the intended purpose because the potential E of the welding machine does not vary much so that it is not necessary to have a special anode direct-voltage source available.

In the event that an extraneous source of anode potential for the tubes is desired, the control of Fig. 3 can be used. Corresponding components in Fig. 3 have also been assigned like reference numerals but with double primes attached to distinguish them from Fig. 1. The Fig. 3 control operates in a similar manner to Fig. 2, the essential difference between the two being that an extraneous source of potential represented by terminals 26 is used as an anode potential for the tubes 8'', 9''. Also the grids 8a'' and 9a'' are controlled by the welding current of the machine across the current transformer 12, with the two secondary windings 12b and also by the potential of the welding machine across resistances 16''.

Unless extremely high demands of quality of the welding spots are made, oxidized light metals, as well as scaled iron sheets can be satisfactorily welded with any of the described control arrangements, while with the previous regulators for resistance welding machines a removal of the scale layer in iron sheets or the oxide layer in light metals is indispensable. Also, when enlarging the window opening of the machine and when immersing ferromagnetic materials into the same, a readjustment is no longer necessary. The regulation of the machine is thus greatly simplified.

In conclusion, it will be understood that the above described embodiments are but typical and that hence minor changes in the construction and arrangement of components may be made without however departing from the spirit and scope of the inventoin as defined in the appended claim.

I claim:

A control device for resistance welders comprising a grid-controlled electric discharge tube, switch actuating means in the discharge circuit of said tube for interrupting the welding current upon ignition of the tube, a grid circuit for said tube comprising a condenser and source of constant negative bias potential constituting a reference potential connected between the grid and cathode elements of the tube, a resistance connected to said condenser, an electronic wattmeter connected in the welding circuit and which produces an output potential proportional to the instantaneous power flowing in the welding circuit to the junction being welded, said electronic wattmeter being comprised of a pair of grid controlled vacuum tubes, means for varying the grid potentials on said vacuum tubes in opposite senses in accordance with the variation in current flowing in the welding circuit comprising a resistance connected across the secondary of a transformer whose primary is series connected in the welding circuit, the terminal ends of said resistance being connected respectively to the grids of said vacuum tubes and a circuit connection from the cathodes of said vacuum tubes to a tap on said resistance intermediate the ends thereof, means for varying the anode potential on said vacuum tubes in accordance with the variations in the welding potential, the output potential of said wattmeter being that produced between the anode circuits of said vacuum tubes, and means connecting said output potential to said resistance whereby to charge said condenser to a potential proportional to the total power consumed at the weld junction, the potential on said condenser in conjunction with said bias potential being effective to ignite said electric discharge tube when a predetermined amount of power has been consumed at the weld junction.

References Cited in the file of this patent

UNITED STATES PATENTS

| Number | Name | Date |
| --- | --- | --- |
| 1,230,357 | Woodrow | June 19, 1917 |
| 1,586,533 | Petersen | June 1, 1926 |
| 2,024,019 | Wright | Dec. 10, 1935 |
| 2,024,542 | Simon | Dec. 17, 1935 |
| 2,105,598 | Hubbard | Jan. 18, 1938 |
| 2,295,297 | Schneider | Sept. 8, 1942 |
| 2,303,505 | Schilling | Dec. 1, 1942 |
| 2,409,888 | Ogden | Oct. 22, 1946 |